United States Patent [19]

Matsuda et al.

[11] 4,141,888

[45] Feb. 27, 1979

[54] PROCESS FOR PRODUCING REDUCED KERATINOUS SUBSTANCES USING UREA OR THIOUREA

[75] Inventors: Hisayuki Matsuda, Nagaokakyo; Minoru Takahashi, Uji; Katsuro Shinoda, Suita; Sho Kikyotani, Osaka; Hiroshi Inagaki, Nagaokakyo, all of Japan

[73] Assignee: Sekisui Kagaku Kogyo Kabushiki Kaisha, Osaka, Japan

[21] Appl. No.: 883,997

[22] Filed: Mar. 6, 1978

[30] Foreign Application Priority Data

Mar. 7, 1977 [JP] Japan .................................. 52-24999

[51] Int. Cl.$^2$ ............................................. C08H 1/06
[52] U.S. Cl. .................................. 260/123.7; 210/38 B
[58] Field of Search ........................ 260/123.7, 112 R; 210/38 B

[56] References Cited

U.S. PATENT DOCUMENTS

| | | | |
|---|---|---|---|
| 2,445,028 | 7/1948 | Jones et al. | 260/123.7 X |
| 2,517,572 | 8/1950 | Jones et al. | 260/123.7 UX |
| 2,717,835 | 9/1955 | Brody | 260/112 R |
| 2,814,851 | 9/1957 | Hervey | 260/123.7 X |
| 3,931,002 | 1/1976 | Ottenheym et al. | 260/123.7 X |

OTHER PUBLICATIONS

Chem. Abstracts, vol. 47, 1953, 1464i–1465a, Woods.
Biological Function and Macromolecule (I), 7th Macromolecule Seminar, Japan Society, pp. 1–3 (English Translation), 1972.

*Primary Examiner*—Howard E. Schain
*Attorney, Agent, or Firm*—Wenderoth, Lind & Ponack

[57] ABSTRACT

A process for producing a reduced keratinous substance having a high adsorptive power for cationic substances, which comprises reducing a substance containing keratin as a main ingredient under alkaline conditions to cleave the disulfide linkages of the keratin, dissolving the reduced keratin in an aqueous medium containing urea or thiourea in a concentration of less than 5 moles/liter, and then acidifying the resulting solution to precipitate the dissolved reduced keratin under such conditions that the thiol side-chains present in the reduced keratin do not substantially undergo oxidation. The reduced keratinous substance is especially useful as a heavy metal ion capturing agent.

12 Claims, No Drawings

PROCESS FOR PRODUCING REDUCED KERATINOUS SUBSTANCES USING UREA OR THIOUREA

This invention relates to a process for producing a novel reduced keratinous substance, and more specifically to a novel process for producing a reduced keratinous substance having a high degree of adsorptive power for cationic substances by reducing a substance containing keratin as a main ingredient, such as animal hair fibers (e.g., wool, mohair, cashmere, or camel hair), feathers, hair on the head, horns, hoofs, nails, or the like.

The "keratinous substance," as referred to in the present application, denotes a substance containing as a main ingredient keratin which is a kind of structural protein. Various keratinous substances exemplified above have been known to have a certain degree of adsorptive power for heavy metal ions, especially a mercury ion, and attempts have been made to exploit them as an adsorbent. These keratinous substances alone, however, do not have enough adsorptive capacities and absorbing speeds to meet practical needs, and it is desired to modify them.

Suggestions have been made to increase the adsorptive capacity and/or the speed of adsorption by, for example, graft-copolymerizing wool with ethyleneimine, acrylonitrile, etc., or by reacting it with an isocyanate, a thiocyanate, etc., or by modifying it by esterification, deamination, etc. The resulting modified keratinous substances, however, have an apparent density of only about 0.05 to 0.2 and their surface areas are not so high. Hence, the modified products are still unsatisfactory for use in adsorption columns.

It has also been known that when wool fibers are treated with a reducing agent such as a thiol compound or phosphine compound to cleave some of their disulfide linkages, the treated fibers have an improved adsorptive power for heavy metal ions and an increased speed of adsorption over the untreated wool fibers. The chemically modified wool fibers, however, retain their fibrous form, and the thiol side-chains formed by the cleavage of the disulfide linkages readily undergo oxidation in the presence of moisture. As a result, the adsorptive power of the modified wool fibers is little different from that of the starting wool fibers. The products, therefore, do not have a utilitarian value.

A method has also been known which comprises causing a protein-hydrolyzing enzyme such as papain to act on wool fibers to cleave the polypeptide molecules which constitute the main chain of keratin contained as a main ingredient in the wool fibers, and thereby to form the wool fibers into a flaky fine powder. The flaky fine powder of wool fibers is known to be usable, for example, as a fixed layer for chromatography to develop various metal ions. Since, however, the disulfide linkages of keratin still remain, the adsorptive power of the fine powder for various metal ions is much the same as that of the untreated wool fibers. Furthermore, the resulting fine powder has an apparent density of as low as 0.1 to 0.2. The method further has the defect that the enzyme used is expensive, and the yield of the flaky fine powder is low.

On the other hand, various synthetic resins having an adsorptive and chelating ability or an ion exchange ability have been developed for treatment of industrial waste waters, and are available commercially. When these resins have been deteriorated after repeated use and regeneration, the recovery of the heavy metals absorbed to the resins must be effected by a special operation such as calcination. The recovering operation is therefore complicated, and may also cause secondary pollution.

It is an object of this invention therefore to provide a reduced keratinous substance having a high degree of selective adsorptive power for cationic substances, for example heavy metal ions, especially a mercury ion; and a process for producing the reduced keratinous substance.

Another object of this invention is to provide a reduced keratinous substance having a high degree of adsorptive power not only for cationic substances, especially a mercury ion, but also for certain anions; and a process for producing the reduced keratinous substance.

Still another object of this invention is to provide a process for producing easily in a high yield a powdery, granular or flaky reduced keratinous substance having a high degree of adsorptive power for heavy metal ions, especially a mercury ion, and a relatively high apparent density.

A further object of this invention is to provide a treating agent for industrial waste waters which can remove various heavy metal ions from the industrial wastes by efficient adsorption, and from which the adsorbed heavy metal ions can be recovered easily.

Other objects and advantages of the invention will become apparent from the following description.

According to this invention, these objects and advantages can be achieved by a process for producing a reduced keratinous substance having a high adsorptive power for cationic substances, which comprises reducing a substance containing keratin as a main ingredient under alkaline conditions to cleave the disulfide linkages of the keratin, dissolving the reduced keratin in an aqueous medium containing urea or thiourea in a concentration of less than 5 moles/liter, and then acidifying the resulting solution to precipitate the dissolved reduced keratin under such conditions that the thiol side-chains present in the reduced keratin do not substantially undergo oxidation.

The characteristic features of the present invention are:

(A) A naturally occurring substance containing keratin as a main ingredient (keratinous substance) is used as a starting material, and reduced under alkaline conditions to cleave substantially completely the disulfide linkages (—S—S—) which form intermolecular bridging chains for the polypeptide chains constituting the keratin;

(B) The reduced keratin is substantially dissolved in an aqueous medium containing urea or thiourea in a relatively low concentration of less than 5 moles/liter; and (C) The resulting solution is acidified while substantially preventing the oxidation of the thiol side-chains in the dissolved keratin, thereby to precipitate the reduced keratin in a solid form such as a powder, granule or flake from the solution.

The reduced keratinous substance provided by the present invention is generally a pale gray to pale yellow, non-transparent, powdery to flaky solid particulate substance, although these characteristics differ according to the type of the starting keratinous substance. The reduced keratinous substance generally has an average particle diameter of 0.02 to 20 mm, preferably 0.2 to 2 mm, and an apparent density, which varies depending upon the dried condition, of generally 0.1 to 1.0 g/cm$^3$, and usually 0.3 to 0.5 g/cm$^3$, which apparent density is far higher than those of the conventional modified keratinous substances. The reduced keratinous substance of this invention may have a surface area of generally 0.1 m$^2$/g to 200 m$^2$/g, usually 10 m$^2$/g to 100 m$^2$/g.

In the process of this invention, the disulfide linkages which form bridging chains for the polypeptide chains of keratin are cleaved by reduction, while substantially retaining the resulting thiol (—SH) side-chains, the reduced keratinous substance is precipitated by utilizing a difference in solubility (isoelectric point). Hence, the reduced keratinous substance provided by this invention contains a very large amount of thiol groups (—SH). For this reason, the reduced keratinous particles of the invention are very reactive, and have a high degree of selective adsorptive power for various cationic substances, especially a mercury ion.

Keratin is a kind of structural (tissue) protein present in large amounts in the skin of vertebrate animals and their tissues growing outwardly of the skin. It is present in great amounts in various tissues of vertebrate animals such as hair, feathers, horns, hoofs and nails. Accordingly, any materials which contain true keratin as a structural protein can be used as a starting material. Examples of the starting material are therefore the horns, hoofs, nails, feathers, and hairs of vertebrate animals; and preferred materials are wool and feathers. These materials can be used either as such or after having been pulverized or cut to suitable sizes.

If desired, the keratinous substances as starting materials may be pre-treated, for example by washing or defatting.

Since the polypeptide chains of the keratinous substances are three-dimensionally crosslinked by, for example, disulfide linkages (cystein bridging), salt-forming crosslinking (bridge) or hydrogen bonding, the keratinous substances are insoluble or only slightly soluble in ordinary solvents, and are not sufficiently decomposed by ordinary proteinases. It is not easy therefore to make them directly into the form of powder, flake, granule, or the like.

According to the process of this invention, such a keratinous substance is reduced under alkaline conditions to cleave the disulfide linkages present in the keratin. The reduction is performed generally in an aqueous medium. Any aqueous media which are stable to reduction and preferably have an affinity for the starting keratinous substance can be used in this invention. Generally, the aqueous medium is water itself or a mixture of it with a water-miscible organic solvent. Examples of the water-miscible organic solvents are lower alkanols such as methanol, ethanol or propanol, phenols such as phenol or cresol, amides such as formamide, and dimethyl sulfoxide. These solvents can be used either alone or as a mixture of two or more. Among these solvents, lower alkanols, especially isopropanol, are preferred. In the mixture of water and the water-miscible organic solvent, the ratio between water and the organic solvent is not particularly limited, and can be varied over a wide range according, for example, to the type of the starting keratinous substance and the type of the reducing agent. Generally, water is desirably contained in an amount at least equal to the volume of the organic solvent. For example, in a mixture of water and isopropanol, the suitable ratio of water to isopropanol is 75:25, especially 80:20.

In performing the reduction, the starting keratinous substance is dipped in the aqueous medium. There is no strict limitation on the weight ratio of the keratinous substance to the aqueous medium. In order, however, to perform the reduction sufficiently and uniformly, the ratio of the keratinous substance to the aqueous medium is conveniently 1:at least 5, usually 1:10 to 1:100, preferably 1:20 to 1:50.

Any reducing agent can be used which can cleave the disulfide bonds (—S—S—) in the keratinous substance to thiol groups (-SH). Generally, organic and inorganic reducing agents which act nucleophilically on disulfide bonds (—S—S—) are preferred. Suitable organic reducing agents are thiol derivatives and phosphorus-containing compounds. Example of organic reducing agents that can be used advantageously are mercaptoethanol, thioglycolic acid and its esters, tributyl phosphine, triphenyl phosphine, and tributyl phosphite. Examples of suitable inorganic reducing agents are sulfites such as sodium sulfite; potassium sulfite and ammonium sulfite; hydrogen sulfites such as a sodium hydrogen sulfite and potassium hydrogen sulfite; hydrosulfides such as sodium hydrosulfide, potassium hydrosulfide and ammonium hydrosulfide; and sulfides such as hydrogen sulfide, sodium sulfide, potassium sulfide and ammonium sulfide.

The reduction can be performed by any known methods. For example, when the thiol derivative or inorganic reducing agent is used, it is used preferably in an excessive equivalent weight, usually at least two equivalent weights, preferably 4 to 10 equivalent weights, per disulfide bond in the keratinous substance. The sufficient amount of the phosphorus-containing compound used as a reducing agent is generally equivalent to or somewhat in excess of the amount of the disulfide bonds in the keratinous substance.

The amount of the disulfide linkages in the keratinous substance can be determined by a colorimetric method, polarography, or amino acid analysis, and specific procedures used in these methods are known [M. Friedman, A. T. Noma, Textile Res. J., 40, 1073 (1970); Hideaki Munakata, Yoshiharu Niinami, Journal of Japanese Textile Society, 19, 392 (1963); Ryoji Nakamura and Yoshio Nemoto, Journal of Japanese Textile Society, 17 428 (1961)].

The reduction in accordance with this invention is carried out advantageously under alkaline conditions to aid in the swelling of the keratinous substance, and to perform the reduction as fully, uniformly and rapidly as possible. The alkalinity attained at this time is expressed by a pH of at least 7.5, preferably about 8 to about 11, more preferably 10 to 11.

Adjustment of the pH can be made by adding an inorganic or organic alkaline substance to the reaction system. Examples of alkaline substances that can be used include inorganic alkalies such as sodium hydroxide, potassium hydroxide, and ammonium hydroxide, and organic bases such as trimethylamine, triethylamine, guanidine, 1,5-diazo-bicyclo(4,3,0)-nonene-5, and 1,8-diazo-bicyclo (5,4,0)-undecene-7.

Such an alkaline substance is added so as to maintain the pH within the above specified range.

There is no particular restriction on the temperature and pressure used at the time of the reduction, and these conditions can be varied according, for example, to the type of the reducing agent used or the type of the starting keratinous substance. Room temperature is sufficient for performing the reduction. If desired, however, the reduction may be carried out under heat, for example at a temperature of up to about 90° C. Atmospheric pressure is sufficient as the reaction pressure, but if desired, the reducing reaction can be performed under reduced or elevated pressures.

Preferably, the reduction is performed in an inert gas atmosphere, for example, in an atmosphere of nigrogen or carbon dioxide gas.

The reduction described hereinabove results in the cleavage of the disulfide linkages in the keratinous substance, and the keratinous substance becomes substantially soluble in the aqueous medium. Some types of keratinous substance do not dissolve sufficiently in the aqueous medium even after the cleavage of the disulfide linkages in the keratinous substances, because secondary bonding (i.e., hydrogen bonding, salt-forming bonding, and hydrophobic bonding) occurs owing to the association of the carboxyl groups, amino groups, hydroxyl groups and other hydrophobic groups (e.g., methyl or dimethyl groups). In order to ensure the dissolving of the reduced keratinous substance in the aqueous medium, urea or thiourea, especially the former, which are frequently used in the field of protein chemistry as a "disassociating agent" having the property of destroying the secondary bonding is included in the aqueous media.

The concentration of urea or thiourea to be included in the aqueous medium is very important for the precipitation of the reduced keratinous substance. It is critical to limit this concentration to less than 5 moles/liter, especially not more than 4.5 moles/liter. The lower limit to this concentration may be 1 mole/liter. Thus, the concentration of urea or thiourea in the aqueous medium is preferably 1 to 4 moles/liter, more preferably 2 to 4 moles/liter.

The reduced keratinous substance can therefore be substantially dissolved in the aqueous medium. Dissolving can be promoted by elevating the temperature of the mixture.

To aid in the dissolving of the reduced keratinous substance in the aqueous medium, a water-soluble inorganic salt such as sodium iodide, lithium bromide or lithium iodide can be added as a dissolution aid. Such a water-soluble inorganic salt can be added in an amount of generally at least 1 mole/liter, preferably 2 to 5 moles/liter, more preferably 3 to 4 moles/liter.

The time of addition of urea or thiourea and the water-soluble inorganic salt to the aqueous medium is not critical. They may be dissolved beforehand in the aqueous medium, or may be added to the reaction mixture obtained by reduction. Generally, it is advantageous to dissolve urea or thiourea in the aqueous medium in the aforesaid concentration before the performance of the reducing reaction. Thus, especially suitable media for the reducing reaction are a water-urea-sodium hydroxide solution and a water-urea-ammonia solution both having a pH of 8 to 11.

By the procedure described above, the reduced keratinous substance can be dissolved substantially in the aqueous medium containing urea or thiourea in the above-specified concentration. In order to precipitate the reduced keratin, its concentration in the aqueous medium should not be too low. Advantageously, the concentration of the reduced keratin is generally at least 0.5 part by weight, preferably 1 to 10 parts by weight, and more preferably 2 to 5 parts by weight, per 100 parts by weight of the aqueous medium.

The resulting solution in which the keratin whose disulfide linkages have been cleaved by reduction is dissolved substantially is then submitted to the subsequent acidifying step. If the solution contains insoluble foreign substances and insoluble solids such as cellular membranous substances which have been introduced together with the starting keratinous substance, they should be separated by such means as filtration or centrifugal separation before the acidification step.

It is necessary that during the separating operation, care should be exercised not to allow the substantial oxidation of the thiol side-chains generated by cleavage of the disulfide linkages. For example, the separating operation is preferably carried out in an atmosphere of an inert gas.

According to the process of this invention, the reduced keratin can be precipitated as a solid by acidifying the solution containing the reduced keratinous substance. It has been found in accordance with this invention that when the pH of the solution of the reduced keratin dissolved under alkaline conditions in the aqueous medium containing urea or thiourea in a concentration of less than 5 moles/liter is shifted to an acidic side, the solubility of the reduced keratin decreases markedly and the keratin precipitates as a gel. The decrease of the solubility is believed to be a reduction in solubility by isoelectric point, and the revival of the secondary bonding by the insufficient amount of urea or thiourea. The pH of the solution required for precipitation is not critical. The pH may be more than 6 at which the solution is slightly acidic. It is generally preferred however to adjust the pH of the solution to not more than 6 because at a higher pH, the reduced keratin tends to be precipitated as a colloid or ultrafine suspended gel, and the thiol groups in the reduced keratin are not stabilized. The lower limit to the pH value is neither critical, and strongly acidic pH values can also be used. Since too strong an acidity may cause hydrolysis of the peptide bonds in the reduced keratin, the pH of the solution is usually about 4 to about 6, preferably 4.5 to 5.5.

The adjustment of the pH can be easily performed by adding to the solution of the reduced keratin a water-soluble acidic substance, for example an inorganic acid such as hydrochloric acid, sulfuric acid, nitric acid or phosphoric acid, or an organic acid such as acetic acid, propionic acid, or p-toluenesulfonic acid. Use of volatile acids especially hydrochloric acid is preferred because, for example, of the ease of separating the acid from the resulting reduced keratin.

Since the thiol side-chains generated by the cleavage of the disulfide bonds by reduction are generally extremely unstable to oxidation (more unstable under alkalinity, and slightly more stable in acidity), in order to recover reduced keratin having substantially unoxidized thiol side-chains, the precipitating operation by acidification should be performed under such conditions that the thiol groups in the reduced keratin do not undergo substantial oxidation. To achieve this end, it is desirable to perform the precipitating operation under non-oxidizing conditions, for example, in an atmosphere of an inert gas such as nitrogen or carbon dioxide gas. The precipitating operation may also be performed in the air if it is done under such conditions that the reduced keratin is not substantially oxidized, for example under such conditions that the air contacts only the surface of the solution containing reduced keratin, and is not blown into the solution.

Room temperature is usually sufficient as the temperature for the precipitating operation. But if desired, gellation may be promoted by cooling the solution. Reduced keratin gels having a more uniform particle size can be obtained by gradually adding the acid with stirring rather then by adding the acid abruptly at a time.

By the above-described process, reduced keratinous substances containing a number of thiol-side chains as active groups can be obtained.

Size adjustment of the solid particles of the reduced keratin substance can be easily performed by properly selecting the concentration of the reduced keratin in the solution, the degree of acidification of the solution, the temperature, the stirring conditions, etc.

The reduced keratinous substance formed as a powder granule or flake can be recovered by ordinary methods such as filtration or centrifugal separation.

The solid particles of the reduced keratinous substance can be dried by ordinary means. It is necessary at this time to select temperatures and atmospheres which do not cause the substantial oxidation of the reduced keratinous substance. Suitably, the solid particles are dried in an atmosphere of an inert gas at a temperature of usually not more than 80° C., preferably not more than 60° C. Drying under reduced pressure is most preferred, but the drying method is not limited to it. Other drying methods can also be used properly. For example, it is advantageous to replace the aqueous medium accompanying the solid particles of the reduced keratinous substance by an alcohol, especially methanol or ethanol, and then drying the mixture.

As described hereinabove, all of the steps of the process of this invention can be advantageously carried out in an atmosphere of an inert gas.

The reduced keratinous substance separated, recovered and dried is generally a pale gray to pale yellow flaky to fine powdery material with the individual particles have an irregular surface with a microporous structure. The reduced keratinous substance obtained can be directly used in applications described hereinbelow.

The reduced keratinous substance produced by the process of this invention exhibits a high degree of selective adsorptive power for cationic substances, for example heavy metal ions, especially a mercury ion and a mercury-containing organic compound such as methyl mercury, and have different adsorptive powers for certain kinds of anionic substances, such as bichromate radical ($Cr_2O_7^{-2}$), a thiocyanide ion ($CNS^{-1}$), and silver cyanide [for example, a ferrocyanide radical ($Fe(CN)_6^{-4}$) or a ferricyanide radical ($Fe(CN)_6^{-3}$)]. Industrial wastes containing these cationic substances and/or anionic substances in various concentrations can be treated with the reduced keratinous substance of the present invention to separate or remove the cationic and/or anionic substances with good efficiency.

The reduced keratinous substance of this invention has a very high speed of adsorbing the cathionic substances and/or anionic substances, and has the ability to adsorb these substances very effectively from a solution containing them within very short periods of time.

In addition to these advantages, the reduced keratinous substance of this invention has the ability to remove substantially all of cationic substances and/or anionic substances from a solution containing them in very low concentrations. For example, one gram of the reduced keratinous substances of this invention, when treating 100 liters of a waste water containing a mercury ion in a concentration of as low as 1 ppm, can reduced the Hg concentration to 0.0001 ppm or below.

Since the reduced keratinous substance of this invention is a polypeptide and can be easily hydrolyzed with a conc. alkali or acid, no special operation such as calcination of the conventional metal adsorbing chelate resins is required, and there is no likelihood of causing secondary pollution.

The reduced keratinous substance of this invention can be used for the separation, removal or recovery of various cationic substances, especially heavy metal ions, and/or anionic substances from various solutions, especially industrial waste waters, either in the form of a fine powder, granule or flake as obtained, or after having been molded into a suitable shape such as a pellet, film, sheet or plate. Thus, the reduced keratinous substance provided by this invention can be used especially advantageously as a heavy metal capturing agent.

The following Examples further illustrate the present invention.

EXAMPLE 1

Twenty grams of wool fibers which had been defatted and washed in a customary manner were immersed in 1000 cc of water containing urea in a concentration of 2 moles/liter, and 10 cc of mercaptoethanol was added as a reducing agent. Sodium hydroxide was added to adjust the pH of the mixture to 10.5, and reduction was performed at 35° C. in a stream of nitrogen for about 24 hours. About 90% of the wool fibers thus dissolved. The insoluble matter was removed by filtration in a stream of nitrogen. The filtrate was stirred while adding 6N hydrochloric acid in a stream of nitrogen to adjust the pH to 5. Thus, a flaky pale yellow precipitate having a size of 0.3 mm to 0.8 mm formed.

The precipitate was filtered in a stream of nitrogen, and washed until most of the urea and mercaptoethanol were removed. The washed product was dried under reduced pressure. The yield of the reduction product obtained was 75% based on the weight of the starting wool fibers, and it had an apparent density of 0.32 g/cc.

To determine the adsorptive power of the resulting reduced keratin, the product was packed into an adsorption column having an inside diameter of 15 mm and a length of 250 mm, and 10 liters of an aqueous solution containing 50 ppm of a mercury ion was passed through the packed column. The mercury concentration of the effluent was measured by an atomic adsorptiometric method. No mercury ion was detected from the effluent.

EXAMPLE 2

Forty grams of wool fibers which had been defatted and washed in a customary manner were immersed in 1,000 cc of water containing urea in a concentration of 4 moles/liter, and 20 cc of mercaptoethanol was added as a reducing agent. Then, sodium hydroxide was added to adjust the pH of the mixture to 10.5. Reduction was performed in a stream of nitrogen at 35° C. for about 24 hours.

The reaction mixture was stirred while adding 6N hydrochloric acid in a stream of nitrogen to adjust the pH to 5, whereupon a flaky pale yellow precipitate formed. The precipitate was filtered in a stream of nitrogen, and wahsed until most of the urea and mercaptoethanol were removed. The washed product was dried under reduced pressure. The yield of the reduction product was 62% based on the starting wool fibers, and the product had an apparent density of 0.38 g/cc.

To determine the adsorptive power of the reduced keratinous substance, it was packed into an adsorption column having an inside diameter of 15 mm and a length of 250 mm, and an aqueous solution containing 29.4 ppm of a mercury ion and 7.0 ppm of a copper ion was passed through it. The effluent was found to contain 0.0004 ppm of a mercury ion and 0.2 ppm of a copper ion.

EXAMPLE 3

The procedure of Example 1 was repeated except that the amount of the wool fibers was changed to 40 g and the amount of the mercaptoethanol was changed to 20 cc.

The reduction product was finer in size than the product obtained in Example 1, and was easy to wash with water and dehydrate.

The yield of the reduction product was 80% based on the starting wool fibers, and the product had an apparent density of 0.37.

EXAMPLE 4

The procedure of Example 1 was repeated except that defatted feathers of chicken (white Leghorn) were used instead of the wool fibers. The reduced feathers had better solubility than wool fibers, and the resulting reaction mixture containing the feathers dissolved in it had an insoluble content of only 2 to 3%. The insoluble matter was removed by filtration in a stream of nitrogen. In a stream of nitrogen 6N hydrochloric acid was added to the filtrate to reduce its pH to 5 and thereby to form a precipitate. The yield of the resulting reduced keratinous substance was 66% based on the starting feathers, and the product had an apparent density of 0.28 g/cc.

To determine the adsorptive power of the reduced keratinous substance, it was packed into an adsorption column having an inside diameter of 15 mm and a length of 250 mm, and an aqueous solution containing 10 ppm of a mercury ion was passed through it. The effluent had a mercury ion concentration of only 0.002 ppm.

EXAMPLE 5

Fifty grams of wool fibers which had been defatted and washed were immersed in a mixture of 800 cc of water and 200 cc of isopropyl alcohol containing 2 moles/liter of urea, and 20 cc of tributyl phosphine was added as a reducing agent. The pH of the mixture was adjusted to 10.6 with sodium hydroxide, and reduction was performed at 35° C. in a stream of nitrogen. When the reduction was continued for 24 hours, about 92% of the wool fibers dissolved. The insoluble matter was removed by filtration in a stream of nitrogen. The filtrate was stirred while adding 6N hydrochloric acid in a stream of nitrogen to adjust the pH to 4.5, whereupon a flaky, white to pale yellow precipitate formed.

The precipitate was filtered, washed with water and dried in a stream of nitrogen to afford a reduced keratinous substance in a yield of 78% based on the starting wool fibers. The apparent density of the product was 0.38 g/cc.

To determine the adsorptive power of the reduced keratinous substance, it was packed into an adsorption column having an inside diameter of 15 mm and a length of 150 mm, and the mercury concentration of the effluent was measured by an atomic absorptiometric method. No mercury ion was detected from the effluent.

EXAMPLE 6

Twenty grams of wool fibers which had been defatted and washed were immersed in 1,000 cc of water containing thiourea in a concentration of 1.5 moles/liter (114 g/liter), and 10 cc of thioglycolic acid was added as a reducing agent. The pH of the mixture was adjusted to 10.5 with sodium hydroxide, and reduction was performed at 35° C. in a stream of nitrogen. When the reduction was continued for 24 hours with shaking, about 87% of the wool fibers dissolved. The insoluble matter was removed by filtration in a stream of nitrogen, and the filtrate was stirred while adding 6N hydrochloric acid, thereby to adjust the pH to 4.5. A flaky pale yellow precipitate formed. The precipitate was filtered, washed with water, and dried under reduced pressure in a stream of nitrogen to afford a reduced keratinous substance in a yield of 78% based on the starting wool fibers. The apparent density of the fibers was 0.35 g/cc.

To determine the adsorptive power of the reduced keratinous substance, it was packed into an adsorption column having an inside diameter of 15 mm and a length of 250 ml, and 10 liters of an aqueous solution containing 50 ppm of a mercury ion was passed through it. The mercury concentration of the effluent was measured by an atomic adsorptiometric method. No mercury ion was detected from the effluent.

EXAMPLE 7

Forty grams of wool fibers which had been defatted and washed and 20 ml of mercaptoethanol as a reducing agent were added to an aqueous solution of thiourea in a concentration of 4 moles/liter which had been obtained by dissolving 304 g of thiourea in 1,000 cc of water. The reduction was carried out at 50° C. in a stream of nitrogen. The pH of the mixture was adjusted to 10.5 with sodium hydroxide and the mixture was treated thereafter in the same way as in Example 6.

A reduced keratinous substance was obtained in a yield of 81% based on the starting wool fibers, and the product had an apparent density of 0.39 g/cc.

Like the product obtained in Example 6, the resulting reduced keratinous substance had the ability to remove a mercury ion completely.

EXAMPLE 8

Twenty grams of wool fibers which had been defatted and washed in a cumstomary manner were immersed in 1,000 cc of water containing urea in a concentration of 2 moles/liter. As a reducing agent, 20 g of sodium hydrosulfide (NaSH) was added, and hydrochloric acid or sodium hydroxide was added to adjust the pH of the mixture to 11.0. The reducing reaction was performed continuously for about 24 hours at 35° C. in a stream of nitrogen. Then, the mixture was stirred while adding 6N hydrochloric acid in a stream of nitrogen to adjust the pH of the solution to 3.5, whereupon a pale yellow flaky precipitate formed.

The precipitate was filtered in an atmosphere of nitrogen, and washed until most of the urea and reducing agent was removed, followed by drying under reduced pressure. A reduced keratinous substance having an apparent density of 0.33 g/cc was obtained in a yield of 80%.

EXAMPLE 9

The procedure of Example 8 was repeated except that 20 g of sodium sulfite was used instead of the sodium hydrosulfide, and the pH of the solution for precipitation after the reduction was changed to 4.0. A reduced keratinous substance having an apparent density of 0.32 g/cc was obtained in a yield of 81%.

EXAMPLE 10

Twenty grams of wool fibers which had been defatted and washed in a customary manner were immersed in a mixture of 800 cc of water and 200 cc of isopropanol which contained urea in a concentration of 2 moles/liter. As a reducing agent, 8 cc of tributy phosphite $[(C_4H_9O)_3P]$ was added, and the pH of the solution was adjusted to 10.8 with sodium hydroxide. The reducing reaction was performed for 24 hours at 35° C. in a stream of nitrogen. Then, the solution was stirred while adding 6N hydrochloric acid in a stream of nitrogen to adjust the pH of the solution to 4.5, whereupon a pale yellow flaky precipitate formed. The precipitate was filtered in an atmosphere of nitrogen, and washed until most of the urea and reducing agent was removed, followed by drying under reduced pressure. A reduced keratinous substance having an apparent density of 0.37 g/cc was obtained in a yield of 75%.

EXAMPLE 11

Twenty grams of wool fibers which had been defatted and washed in a customary manner were immersed in 1,000 cc of water. As a reducing agent, 10 cc of mercaptoethanol was added, and the pH of the mixture was adjusted to 10.5 with sodium hydroxide. The reducing reaction was performed continously for about 24 hours at 35° C. in a stream of nitrogen. At this stage, the reduced wool fibers were only swollen, and scarcely dissolved. Then, 150 g of urea was added and the concentration of urea was adjusted to about 2 moles/liter. The mixture was stirred for 12 hours in a stream of nitrogen. As a result, about 88% of the reduced wool fibers dissolved.

Then, the solution was stirred while adding 6N hydrochloric acid in a stream of nitrogen to adjust the pH of the solution to 5.0, whereupon a pale yellow flaky precipitate formed.

The precipitate was filtered in a stream of nitrogen, and washed until most of the urea and reducing agent was removed, followed by drying under reduced pressure. A reduced keratinous substance having an apparent density of 0.2 to 0.9 g/cc was obtained in a yield of 76%.

The average particle diameter, the thiol group content, the Hg adsorbing ability, and the surface area of the reduced keratinous substances obtained in the foregoing Examples were determined. The results are tabulated below together with the yields and apparent densities of the products. The thiol group content, the Hg adsorbing ability and the surface area were measured by the following methods.

(1) Thiol group content

Measured by the colorimetric method described in Textile Research Journal, Vol. 26, 332-336 (1956).

(2) Hg adsorbing ability 100 mg of a sample of reduced keratinous substance was added to 50 cc of water containing 300 ppm of $HgCl_2$ (pH 7). The mixture was shaken at room temperature for 30 minutes, and filtered. The concentration of the remaining Hg in the filtrate was measured, and the amount of Hg adsorbed was calculated.

(3) Surface area

Measured by the B.E.T. method.

| Example | Yield (%) | Thiol group content (moles/g) | Amount of Hg adsorbed (mg/g) | Particle diameter (mm) | Apparent density (g/cc) | Surface area $cm^2/g$ |
|---|---|---|---|---|---|---|
| 1 | 75 | 982 | 143 | 0.3–0.8 | 0.32 | 99.1 |
| 2 | 62 | 1002 | 146 | 0.3–1.7 | 0.38 | 57.4 |
| 3 | 80 | 1003 | 146 | 0.2–2.0 | 0.37 | 42.1 |
| 4 | 66 | 631 | 85 | 0.1–0.8 | 0.28 | 79.8 |
| 5 | 78 | 995 | 145 | 0.5–2.0 | 0.38 | 36.3 |
| 6 | 78 | 947 | 162 | 0.3–2.0 | 0.35 | 73.4 |
| 7 | 81 | 981 | 158 | 0.2–2.0 | 0.39 | 71.2 |
| 8 | 80 | 635 | 121 | 0.1–0.7 | 0.33 | 32.4 |
| 9 | 81 | 627 | 124 | 0.1–0.8 | 0.32 | 25.9 |
| 10 | 75 | 1000 | 144 | 0.2–1.5 | 0.37 | 57.2 |
| 11 | 76 | 977 | 143 | 0.2–0.9 | 0.31 | 64.0 |

What we claim is:

1. A heavy metal ion capturing agent comprising a reduced keratinous substance having a high adsorptive power for cationic substances; said reduced keratinous substance being produced by reducing a substance containing keratin as a main ingredient under an alkaline condition of a pH of about 8 to about 11 to cleave the disulfide linkages of the keratin, dissolving 1 to 10 parts by weight of the reduced keratin in 100 parts by weight of an aqueous medium containing urea or thiourea in a concentration of less than 5 moles/liter, and then acidifying the resulting solution to a pH of about 4 to about 6 to precipitate the reduced keratinous substance in the form of powders, granules or flakes having a surface area of 0.1 to 200 $m^2/g$, all the foregoing process steps being carried out in an atmosphere is an inert gas.

2. The agent of claim 1, wherein the keratinous substance is wool or a feather.

3. The agent of claim 1, wherein the reduction is performed at a pH of 10 to 11.

4. The agent of claim 1, wherein the reduction is carried out by using a reducing agent which acts nucleophilically on the disulfide linkages and is selected from the group consisting of thiol derivatives, phosphorus-containing compounds, sulfites, hydrogen sulfites, hydrosulfides and sulfides.

5. The agent of claim 1, wherein the aqueous medium contains urea or thiourea in a concentration of 1 to 4 moles/liter.

6. The agent of claim 1, wherein the aqueous medium is water or a mixture of water with a water-miscible organic solvent.

7. The agent of claim 6, wherein the water-miscible organic solvent is a lower alkanol.

8. The agent of claim 1, wherein the aqueous medium additionally contains a water-soluble inorganic salt.

9. The agent of claim 1, wherein the solution contains at least 0.5 part by weight of the reduced keratin per 100 parts by weight of the aqueous medium.

10. A process for producing a reduced keratinous substance having a high adsorptive power for cationic substances, which comprises reducing a substance containing keratin as a main ingredient under alkaline conditions at a pH of about 8 to about 11 to cleave the disulfide linkages of the keratin, dissolving 1 to 10 parts by weight of the reduced keratin in 100 parts by weight of an aqueous medium containing urea or thiourea in a concentration of less than 5 moles/liter and then acidifying the resulting solution to a pH of about 4 to 6 to precipitate the dissolved reduced keratin in the form of powders, granules or flakes having a surface area of 0.1 to 200 m/g, all of the foregoing process steps being carried out in an atmosphere of an inert gas.

11. The agent of claim 1, wherein the reduction is carried out in the aqueous medium containing urea or thiourea in a concentration of less than 5 moles/liter.

12. A process according to claim 10, wherein the reduction is carried out in an aqueous medium containing urea or thiourea in a concentration of less than 5 moles/liter.

* * * * *